United States Patent [19]
Mellows

[11] 3,933,513
[45] Jan. 20, 1976

[54] REFRACTORY HEAT INSULATING MATERIALS
[75] Inventor: Vincent Edward Mellows, Birmingham, England
[73] Assignee: Foseco Trading A.G., Chur, Switzerland
[22] Filed: Oct. 2, 1973
[21] Appl. No.: 402,780

[30] Foreign Application Priority Data
Oct. 19, 1972 United Kingdom............... 48248/72

[52] U.S. Cl..................................... 106/65; 106/67
[51] Int. Cl.² ........................................ C04B 35/80
[58] Field of Search...................... 106/40 R, 65, 67

[56] References Cited
UNITED STATES PATENTS

| 3,510,394 | 5/1970 | Cadotte | 106/40 R |
| 3,770,466 | 11/1973 | Wilton | 106/65 |

Primary Examiner—J. Poer
Attorney, Agent, or Firm—Cushman, Darby & Cushman

[57] ABSTRACT

By the simultaneous use of a high-swelling clay and a flocculant for the clay, which also acts as a surface active agent, hot top lining slabs free of both paper and asbestos may be produced by a slurry dewatering process.

6 Claims, No Drawings

REFRACTORY HEAT INSULATING MATERIALS

This invention relates to refractory heat insulating materials.

In casting molten metals to form ingots it is customary thermally to insulate the ingot heat metal while allowing the body of the ingot to cool and solidify. Molten metal from the head then feeds to the body of the ingot to compensate for the shrinkage on solidification and minimise the formation of pipe. This thermal insulation is generally achieved by lining the inside of the ingot mould as its head (or the head box, in the case of a mould with a head box) with a plurality of preformed slabs or a layer of refractory heat insulating material. For convenience these materials are commonly referred to as hot tops or hot top linings.

In the past, these slabs have been made usually of a mixture of granular refractory material, usually silica sand, fibre of organic or inorganic origin and a binder. In order to obtain hot strength, improved thermal insulation and molten metal penetration resistance, asbestos fibre has often been used, but its use is increasingly restricted by anti-asbestosis laws and regulations. Furthermore, the use of silica is increasingly attracting censure as a possible silicosis source.

Quite apart from being more expensive to use alternate materials than silica and asbestos, it is noteworthy that the refractory heat insulating materials are more difficult to manufacture by the slurry dewatering process using synthetic refractory fibres (e.g. alumino-silicate, calcium silicate fibre) than asbestos.

One standard mode of manufacture of such materials is to form an aqueous slurry of the necessary ingredients and dewater this slurry against a mesh. This leaves a damp layer of deposited solids which is subsequently stripped from the mesh and dried in an oven to give a dry slab. In order to give optimum characteristics to the slurry, it has long been the practice to include a proportion of paper pulp or asbestos in the mix. This provides the slurries with excellent de-watering and suspension properties, subsequently yielding a heat insulating slab having a substantially uniform thickness together with excellent surface finish. However, for certain applications, e.g. in vacuum casting, the presence of paper fibre or other organic material is disadvantageous since gases are evolved which are readily entrapped in the solidifying metal, causing defects in the final ingot or finished metal product, such as rolled metal sheets. In some cases this generation of gas in use may result in a diminution of the vacuum applied. A further disadvantage is the liability to thermal degradation and to consequent loss of strength of the insulating lining if the slabs are applied to hot moulds or head boxes. In modern steelworks practice it is becoming increasingly common for the mould and head boxes to be very hot when the ingots are stripped, and to be re-cycled immediately. Accordingly, they may still be at 200°–600°C when the new lining is applied. These disadvantages in these applications militate against the use of paper pulp, but if it is omitted from a slurry, which is also asbestos-free, then dewatering becomes very difficult, and indeed the formation of a homogeneous slurry may well be impossible.

According to the present invention a refractory heat insulating slab is formed of a composition comprising by weight 84–35% of a heavy refractory filler, 6–35% of a refractory fibrous material other than asbestos, 0.5–10% of a high swelling clay, 1–10% of a binding agent, and 0.01–2% of a flocculating agent for the clay and 0–10% of a lightweight refractory filler, the slab being free or substantially free of cellulosic fibre.

The present invention also includes a method of making slabs of refractory heat insulating material which comprises dewatering against a perforate surface a quantity of an aqueous slurry of the ingredients just defined to form a damp solid layer, and removing and drying the said layer. This process can be carried out by conventional methods without difficulty. It is found that if flocculating agent for the clay is omitted, then dewatering the slurry is difficult and time consuming, and in extreme cases where fibres other than asbestos are employed it is virtually impossible to produce a homogeneous insulating slab of uniform dimensions.

The compositions used can be formed by dewatering to give slabs because of the selection of the clay/flocculating agent system, the inclusion of which overcomes the manufacturing disadvantages introduced by omitting paper pulp from the slurry. If the clay is used alone, e.g. 10% by weight bentonite and no flocculating agent, then the dewatering properties of an aqueous slurry of the ingredients are so poor that dewatering is practically impossible even though the suspension and homogeneity of the slurry may be satisfactory. If 5% bentonite is used with no flocculating agent, dewatering times are still very long (e.g. 5 minutes) but as soon as a small proportion of flocculating agent for the clay is included, the dewatering times drop rapidly to an economic and practical level. Preferably the proportion of clay in the slurry is kept as low as possible consistent with satisfactory suspension and dewatering properties of the slurry. Higher concentrations of clay can lead to poor dry strength in the slabs and the risk of mesh clogging in the machinery used in manufacture.

The quantity of flocculating agent used should be sufficient to flocculate the clay adequately to give good dewatering; the flocculating agent, however, also performs a dual role as a surface active agent helping to disperse the refractory fibrous material and the fillers in the slurry. Too much flocculant should be avoided, both on grounds of economising and, where surface active materials liable to generate a foam are chosen, to avoid excessive foaming of the slurry during mixing. Additionally, if too high a concentration of flocculant is employed, there is a risk of entrapment of low density components of the slurry in a foam layer, leading to a final undesirably inhomogeneous product.

Preferably the ingredients are adjusted so as to give a final dry slab of density 0.4–1.1 grams per c.c.

The heavy filler, i.e. one having a bulk density of over 1.2 gm/cc is preferably not silica (in order to avoid any silicosis hazard) but rather is a refractory silicate such as zircon or olivine, or an oxide such as zirconia, alumina, magnesia.

The refractory fibrous material may be a pure aluminosilicate or calcium silicate material, or it may be glass fibre, rock wool, mineral wool or slag wool.

The high-swelling clay is preferably a bentonite type e.g. sodium bentonite.

The binding agent may be selected from those conventionally used in the refractory heat insulating materials art, for example, synthetic resin (urea or phenol formaldehyde resins are preferred) or starch.

The flocculating agent/surfactant for the clay may be chosen from a wide variety of materials. For bentonite-type clays, quaternary ammonium salts are preferred flocculating agents, e.g. dialkyl quaternary ammonium chlorides where the alkyl group contains from 6-20 carbon atoms.

The lightweight refractory filler, i.e. one having a bulk density of less than 0.3 grams per c.c., if used may be for example, kieselguhr, expanded perlite or vermiculite, fly ash floaters, hollow alumina microspheres, calcined diatomite, calcined pozzolana or calcined rice husks.

The following examples will serve to illustrate the invention.

EXAMPLE 1

Silica Flour 73.0%
Lightweight Filler 4.0%
Inorganic Fibre 14.5%
Organic binder 6.0%
Sodium Bentonite 2.0%
Di Alkyl Quaternary Ammonium Chloride 0.5%

An aqueous slurry of the above ingredients was formed in a hydropulper. The slurry was pumped into a mould having one surface made of pervious mesh until sufficient slurry to form a dry slab 17 mm thick had been charged. Super atmospheric (40 lb/sq.in.) pressure was then applied to the surface of the slurry which expressed all the surplus water from the slab. The dewatering time was 30 seconds. The 'green' slab formed was transferred to a drying oven at 150°C. The final dried cured slab produced possessed a density of 0.80 gms/cc and a transverse strength of 200 lbs/sq.in. The overall dimensions and surface finish of the cured slab were fairly smooth indicating that the slurry mixture was homogeneous during the forming process.

EXAMPLE 2

| | |
|---|---|
| Fine Olivine Sand | 80.0 parts by weight |
| Sodium Bentonite | 2.5 parts by weight |
| Slag Wool | 7.5 parts by weight |
| Organic Binders | 5.0 parts by weight |
| Di Alkyl Quaternary Ammonium Chloride | 1.0 parts by weight |

The procedure outlined in Example 1 was repeated with corresponding acceptable results. The density of the final slab was 1.15 gm/cm$^3$. The dewatering time needed was 75 seconds for a slab of thickness 27 mm.

EXAMPLE 3

| | |
|---|---|
| Refractory particulate filler | 94.2% |
| Inorganic fibrous material | 0.5% |
| Organic binder | 4.0% |
| Surfactant/Flocculant | 0.3% |
| Sodium Bentonite | 1.0% |

Slabs of thickness 40 mm could be made by dewatering an aqueous slurry of these ingredients for 35 seconds. The density of the final dried slab was 0.85 gm/cm$^3$.

EXAMPLE 4

| | |
|---|---|
| Lightweight filler | 4.0% |
| Sand | 83.7% |
| Inorganic fibrous material | 7.0% |
| Organic binder | 4.0% |
| Surfactant/Flocculant | 0.3% |
| Sodium Bentonite | 1.0% |

Slabs of thickness 25 mm could be formed from an aqueous slurry of these ingredients using a dewatering time of 40 seconds. The density of the final dry slabs was 0.95 gm/cc.

We claim as our invention:

1. A refractory heat insulating slab formed of a composition comprising by weight:
    84-35% of a heavy refractory filler,
    6-35% of a refractory fibrous material selected from the class consisting of mineral wool, slag wool, rock wool and glass fiber,
    0.5-10% of a high swelling clay,
    1-10% of a binding agent selected from the class consisting of urea formaldehyde resins and phenol formaldehyde resins,
    0.01-2% of a flocculating agent for the clay and
    0-10% of lightweight refractory filler, the slab being at least substantially free of cellulosic fiber.

2. The slab of claim 1 wherein the heavy refractory filler is selected from the class consisting of refractory silicates and refractory oxides.

3. The slab of claim 1 wherein the clay is a bentonite clay.

4. The slab of claim 3 wherein the flocculating agent is a quaternary ammonium salt.

5. The slab according to claim 1 and containing lightweight refractory filler selected from the class consisting of kieselguhr, expanded perlite, expanded vermiculite, fly ash, fly ash floaters, hollow alumina microspheres, calcined pozzolana and calcined rice husks.

6. In the method of making a slab of refractory heat insulating material, the improvement which comprises forming an aqueous slurry of the following ingredients in the following proportions by weight:
    84-35% of a heavy refractory filler,
    6-35% of a refractory fibrous material selected from the class consisting of mineral wool, slag wool, rock wool and glass fiber,
    0.5-10% of a high swelling clay,
    1-10% of a binding agent selected from the class consisting of urea formaldehyde resins and phenol formaldehyde resins,
    0.01-2% of a flocculating agent for the clay and
    0-10% of lightweight refractory filler, the slurry being at least substantially free of cellulosic fiber, dewatering a quantity of such aqueous slurry against a perforate surface to form a damp solid layer and removing and drying the layer so formed.

* * * * *